Patented June 24, 1924.

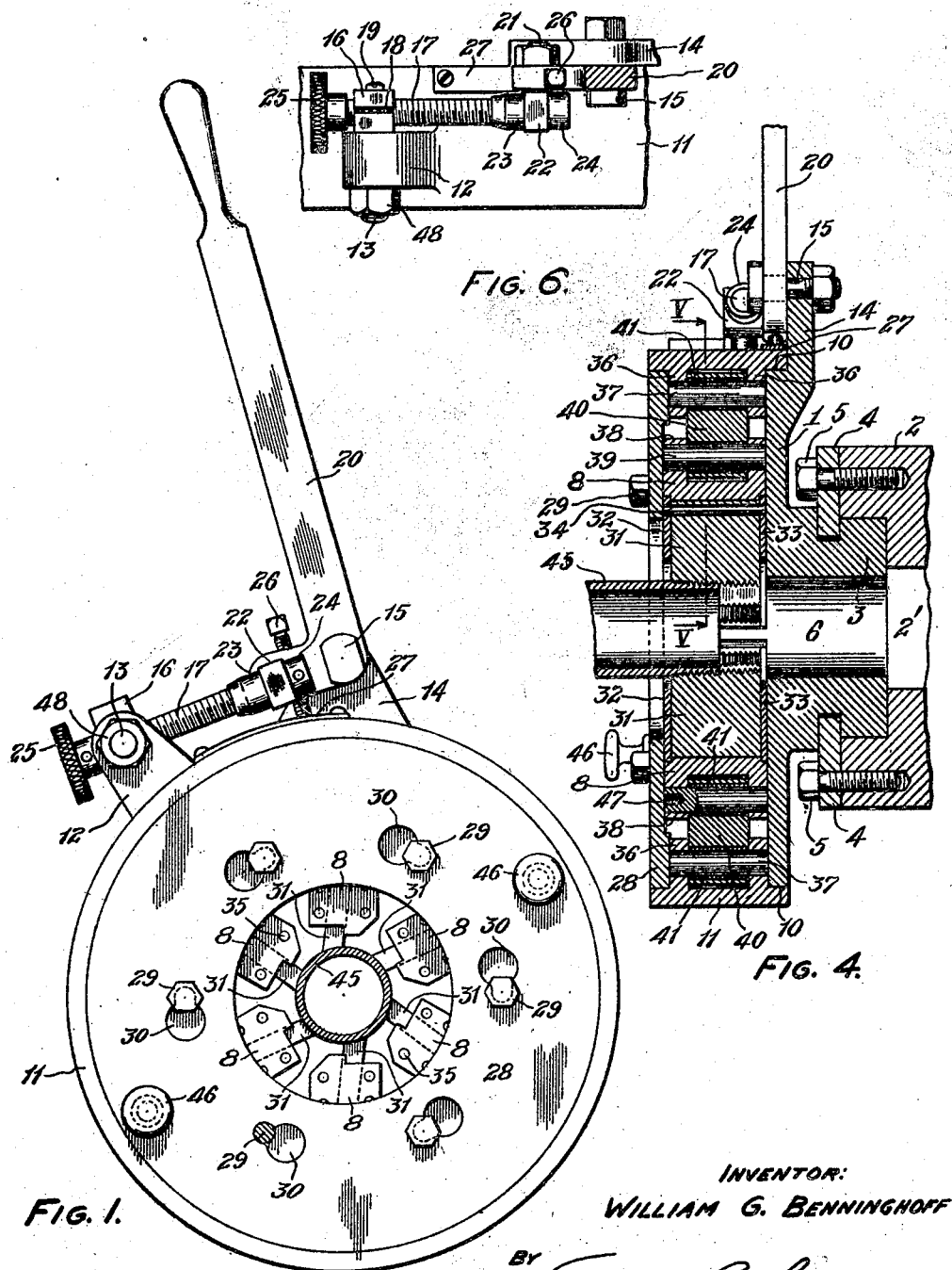

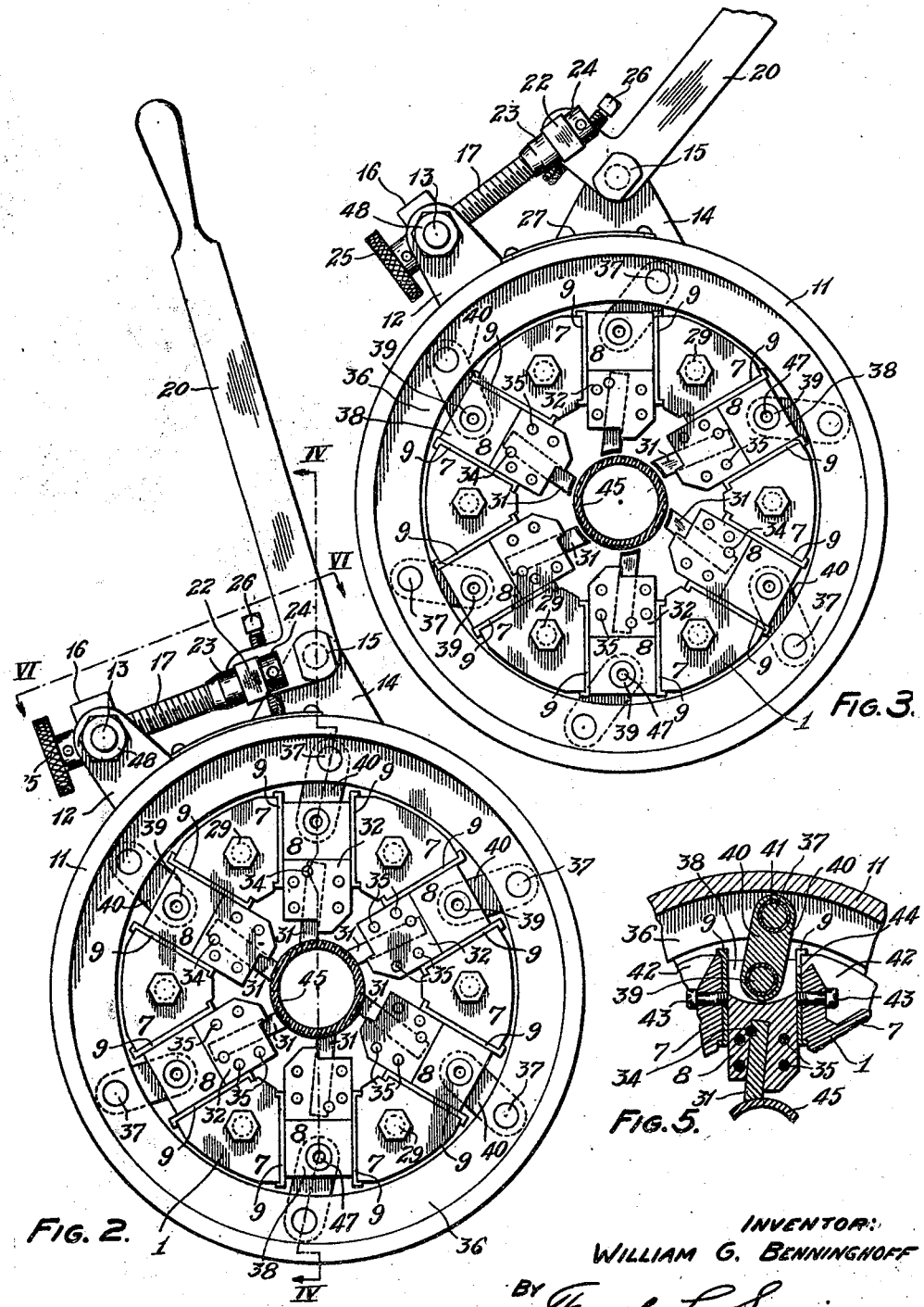

1,498,775

UNITED STATES PATENT OFFICE.

WILLIAM G. BENNINGHOFF, OF CLEVELAND HEIGHTS, OHIO.

THREAD-CUTTING DIE.

Application filed July 21, 1921. Serial No. 486,385.

*To all whom it may concern:*

Be it known that I, WILLIAM G. BENNINGHOFF, a citizen of the United States, residing at Cleveland Heights, in the county of Cuyahoga and State of Ohio, have invented certain new and useful Improvements in Thread-Cutting Dies, of which the following is a specification.

My invention relates to that class of thread cutting dies in which movable thread chasing tools are mounted in a die body in such a manner that they may be moved, in a direction transverse to the axis of the bar or pipe to be threaded, into and out of their cutting positions. In the operation of such thread cutting dies the tools are first moved into their cutting positions and then the die body in which the tools are secured is advanced toward the end of the work to be threaded, or, the work to be threaded is advanced toward the die body, while the bar or pipe which constitutes the work is rotated about its axis for the purpose of causing the tools to cut such a thread as they are adapted to cut. When the desired length of thread has been formed upon the work the tools are retracted from their cutting positions and the work is withdrawn from the die or the die is withdrawn from the work.

Among the objects of my invention are the provision of a thread cutting die in which short pieces of tool steel constituting the cutting tools may be employed thus minimizing the cost of the tools; the provision of a thread cutting die in which the retraction of the tools away from the work after the thread has been cut is slow during the first part and rapid during the last part of the retracting movement; the provision of a thread cutting die in which the tools are always presented to the work at the proper angle for the most efficient cutting; the provision of a thread cutting die in which the tools may be supported in guides having renewable hardened wearing surfaces; the provision of a thread cutting die in which the tools are advanced toward and retracted from the cutting position by means of pivoted links thus avoiding the sliding friction which is present when cams or cam slots are employed for this purpose; the provision of a simplified mechanism for thread cutting dies; the provision of readily interchangeable tool holders for thread cutting dies; and the provision of means for accurately positioning the cutting tools in their holders. These and other objects of my invention are accomplished by the use of my invention described in the following specification and shown in the accompanying drawings in which—

Fig. 1 is a front end view of a thread cutting die embodying my invention;

Fig. 2 is a view similar to that shown in Fig. 1 but with the cover plate removed to expose the cutting tools when the die is closed and the tools are in cutting position;

Fig. 3 is a view similar to that shown in Fig. 2 but with the cutting tools retracted out of the cutting position;

Fig. 4 is a section on line IV—IV of Fig. 2;

Fig. 5 is a fragmentary section on line V—V of Fig. 4; and

Fig. 6 is a fragmentary section on line VI—VI of Fig. 2.

Referring to the drawings 1 represents the body of the die which may be secured in any convenient manner to a support, 2, such as the tail-stock of a thread cutting machine. As shown in the drawings the body, 1, is provided with a hub, 3, which is fitted into a suitable aperture in the support, 2, and secured therein by means of clamps, 4, 4, and bolts, 5, 5. A central aperture, 6, is provided in the body member, 1, and another aperture, 2', is provided in the support, 2, to permit the bar or pipe constituting the work which is being threaded to pass through these members when long threaded portions are being cut upon the work.

The body member, 1, has formed integrally with it or secured to it segmental blocks, 7, accurately spaced and machined to form guides for the sliding tool holders, 8, in their radial movements. I prefer to provide the wearing faces of the tool holder guide slots with renewable wearing gibs such as those shown at 9. The tool holders, 8, and the gibs, 9, are preferably made of hardened steel.

The body member, 1, is provided with a disk like flange which is accurately finished upon its outer periphery, 10, to form an annular bearing and upon this finished flange there is rotatably mounted a tool operating member in the form of an outer ring, 11. The member, 11, is provided with a lug, 12, having an aperture for the reception of a swivel bolt, 13. The body, 1, is provided with a bracket, 14, having an aperture for the reception of the lever fulcrum pin or bolt, 15. The head, 16, of swivel bolt, 13, is provided with a threaded transverse aperture for the reception of an adjusting screw, 17, the head, 16, being split on one side as shown at 18 in order that the screw, 17, may be clamped in adjusted position by means of a clamping screw, 19.

20 is a die opening and closing lever fulcrumed upon the pin, 15, which is secured in the bracket, 14. The lever, 20, is of bell crank form having swiveled in its shorter end a swivel bolt, 21, having a transverse aperture in its head, 22, in which the screw, 17, is rotatably mounted. Shoulders, 23 and 24, are provided upon the screw, 17, to prevent its endwise movement in the head, 22, of bolt, 21. A knurled head, 25, may be provided upon screw, 17, for the purpose of turning the latter in its nut, 16, for adjusting the position of ring, 11, upon the body member, 1. A set screw, 26, may be provided in a suitably threaded aperture in the lever, 20, to form an adjustable limit stop for the closing movement of the dies, the set screw, 26, being preferably hardened and a hardened stop such as that provided by the hardened steel plate shown at 27 being preferably provided upon the member, 11, to prevent the set screw from wearing into the tool operating member, 11, as such wearing might result in inaccurate depths of the thread being cut upon the work.

A cover plate, 28, may be provided for retaining the tool holders, 7, in their guides, and cap screws, 29, may be threaded into blocks, 7, for the purpose of securing the cover plate, 28, to the body member, 1, and supporting it thereon. The outer periphery of the cover plate, 28, may be accurately turned to form an additional annular bearing for the ring, 11. I prefer to provide key holes or bayonet slots, 30, in the cover plate, 28, these key holes having large openings, adapted, when the screws, 29, are loosened slightly and the plate, 28, revolved to bring the heads of the screws, 29, into alignment with the enlarged portions of the key holes, 30, to permit the removal of the cover plate, 28. When it is desired to clamp the plate in position it is revolved in the opposite direction relative to the body member, 1, to bring the bolts or screws, 29, into the smaller portions of the key holes, 30, and when in such position the screws, 29, may be tightened to clamp the plate, 28, firmly upon the body member, 1.

The tool holders, 8, are provided with accurately finished sockets for the reception of the cutting tools, 31. These sockets are preferably formed by first cutting slots through the tool holders, 8, of the proper width and depth to receive the tools and then securing the plates, 32, 33, to the tool holders for the purpose of holding the tools, 31, in accurate position longitudinally of the work in the holders, 8. The tool socket is preferably cut at an angle to the radial line of movement of the tool holder so that the cutting portions of the tool will be presented to the work at the proper place upon the surface of the work and at the proper angle for most efficient cutting. It will be seen that my construction of tool holders and tools permits of their being made out of standard rectangular bars of steel without forging or bending. Tool retaining pins, 34, fitted in holes formed partly in the tool holders, 8, and partly in the tools, 31, and extending through the plates, 32—33, are employed for securing the tools in their sockets in the tool holders against movement transverse to the axis of the work. The retaining plates, 32—33, may be secured to the tool holders, 8, by means of rivets or pins, 35. When the tool and tool holder are thus constructed, the tool is accurately positioned and securely held in the holder, the tool and tool holder forming virtually an integral tool, but having the advantage of a renewable cutting member.

The tool operating member, 11, is preferably provided with one or more inwardly extending flanges, 36, in which suitable apertures are formed for the reception of link pins, 37. The tool holders, 8, are preferably provided with flanges, 38, in which suitable apertures are formed for the reception of link pins, 39. Links, 40, pivoted at their ends upon the pins, 37 and 39, connect the tool holders, 8, with the tool operating member, 11, so that when the latter is rotated upon its bearing, 10, upon body member, 1, the tool holders, 8, and the tools, 31, carried by them are simultaneously caused to move toward or away from the axis of the work depending upon the direction in which the tool operating member, 11, is rotated.

Hardened steel bushings, 41, may be provided in the links, 40, forming bearings for pins, 37 and 39, which are also preferably made of hardened steel. Recesses such as shown at 42 in Fig. 5 may be provided in blocks, 7, to permit the ready insertion of screws, 43, which may be employed for holding the wearing plates, 9, in place. The plates, 9, may be slotted as shown at 44, Fig. 5, to permit the free movement of links, 40, when the cutting tools are retracted from their cutting positions.

In the drawings the work is represented as being a pipe, 45, and the cutting tools, 31, are represented as pipe threading tools. It will be understood that these tools are so made that when they are secured in their holders and placed in the die their cutting portions are presented to the work in correct alignment with the threads at the points where the tools contact with the work. It will be understood also that any convenient number of tools may be employed, six being shown in the preferred embodiment of my invention illustrated in the drawings. While it is possible to cut threads upon bars of different diameters by the use of the same tools I prefer to employ different tools and different tool holders for each diameter of work to be threaded in order that the tools may be made and inclined to the work for the most efficient cutting.

It will be obvious to those skilled in the art that other forms of tools besides threading tools, for instance, cutting off tools, may be readily used in my invention.

When it is desired to change the set-up of tools in the die, the cover plate, 28, is removed by slightly loosening the cap screws, 29, and revolving the plate, 28, to bring the enlarged portions of key holes, 30, under the screw heads, after which the plate, 28, may be removed. For this purpose knobs such as are shown at 46 may be employed, they being preferably secured to the cover plate, 28, by having their shanks riveted to it. After the plate, 28, has been removed from the die body the tools and tool holders are exposed as seen in Figs. 2 and 3. When thus exposed the pins, 39, may be withdrawn by inserting a hook, or a small threaded rod into threaded holes, 47, which I prefer to provide in these pins for this purpose. The tool holders, 8, may now be removed from the die and other tool holders with properly formed cutters in them may be placed in the guides and secured to the links, 40, by reinserting the pins, 39. If desired the outer rim, 11, may be removed from the body of the die for the purpose of more readily effecting a change of set-up of the cutting tools by first removing nut, 48, from bolt, 13. To remove the tools, 31, from holders, 8, pins, 34, are withdrawn after which the tools, 31, may be removed from their sockets. It will be observed that the tool holders, 8, are interchangeable and that the tools, 31, are also interchangeable and renewable. When placing a set of holders and thread cutting tools in the die it is only necessary to take care that the holders are placed in the proper guide slots so that the tools will stand in the proper sequence around the die to have their cutting portions contact with the work in alignment with the threads at the point of contact between the tools and the work.

An important feature of my invention is the non-adjustable and fixed positioning of the tools in their holders as distinguished from set screw or other adjustable securing means. My tools and their holders are thus made virtually integral structures, and operate as such, but with the advantages of economy of high cost tool steel, interchangeability without adjustments, and renewability.

In the operation of a thread cutting die embodying my invention, assuming that the work, 45, is properly secured in a suitable chuck and is being rotated, the die is first "closed" by moving lever, 20, until the stop screw, 26, is arrested by the plate, 27, upon the tool operating member, 11. It will be observed when the die is "closed" as shown in Fig. 2, that the link, 40, stands at a small angle of inclination to the tool holder, 8, so that they together form a toggle in an advantageous position to resist the outward thrust of the tools caused by their contact with the work. The work is now fed towards the die, or the die towards the work, in the usual manner, while the work continues to revolve and the desired length of thread is cut, whereupon the die is "opened" by a reverse movement of lever, 20, from that required to "close" the die. Due to the position of the toggle composed of tool holder, 8, and link, 40, a strong pull but a slow movement is imparted to the tool, 31, during the first part of the retracting movement, and a quicker movement after the tool is out of contact with the work. This feature makes the die easy to operate, and produces a well finished, clean cut thread where the tool leaves the work. After the die is open, the work may be removed in the usual manner.

I am aware that various forms of thread cutting dies have been proposed for accomplishing some of the purposes of my invention but so far as I am aware neither the structure nor the principles of my invention have heretofore been proposed.

Having thus described my invention I claim:

1. In a thread-cutting die, a body having an annular bearing facing radially outwardly, a cover plate and means for supporting it on said body, said cover plate having an annular bearing facing outwardly, a ring fitting said two annular bearings and adapted to have rotative adjustment thereon, tool-holders within the chamber between said cover plate and said body and operating means connecting said tool-holders to said ring, and means connecting the body to the ring for rotatively adjusting the ring for advancing or retracting the tools.

2. In a thread-cutting die, a body having an annular bearing facing radially outwardly, a cover plate and means for supporting it on said body, said cover plate having an annular bearing facing outwardly, a ring fitting said two annular bearings and adapted to have rotative adjustment thereon, tool-holders within the chamber between said cover plate and said body and operating means connecting said tool-holders to said ring, and means connecting the body to the ring for rotatively adjusting the ring for advancing or retracting the tools, said ring having a pair of annular flanges extending into the chamber between the cover plate and the body and having bearing against the cover plate and the body respectively.

3. In a thread-cutting die, a body having an annular bearing facing radially outwardly, a cover plate and means for supporting it on said body, said cover plate having an annular bearing facing outwardly, a ring fitting said two annular bearings and adapted to have rotative adjustment thereon, tool-holders within the chamber between said cover plate and said body and operating means connecting said tool-holders to said ring, and means connecting the body to the ring for rotatively adjusting the ring for advancing or retracting the tools, the means for securing the cover plate to the body consisting of headed bolts mounted in the body and extending through bayonet slots in the cover plate, whereby by rotating the cover plate the heads of the bolts may be brought opposite the larger parts of the slots to thus permit the cover plate to be removed.

4. In a thread-cutting die, a body having an annular bearing facing radially outwardly, a cover plate having a similar bearing, means for detachably attaching said cover plate to the body, a rotatively adjustable ring mounted on said annular bearings, means for rotatively adjusting this ring, this ring being provided with a pair of separated annular flanges lying respectively against the cover plate and the body, radially-movable tool-holders guided between lugs formed on the body within the cavity formed between the body and the cover plate, and pivotal links connecting the tool-holders to the aforesaid inwardly-extending flanges on the ring, the outer ends of the links lying between the flanges.

In testimony whereof I affix my signature.

WILLIAM G. BENNINGHOFF.